United States Patent
Haschke et al.

(10) Patent No.: US 7,121,940 B2
(45) Date of Patent: Oct. 17, 2006

(54) CONTINUOUS AUTOMATIC RACK LOADER

(75) Inventors: Eggo Haschke, Deerfield, IL (US); Robert Pinto, Chicago, IL (US)

(73) Assignee: Poly-Clip System Corp., Mundelein, IL (US)

(*) Notice: Subject to any disclaimer, the term of this patent is extended or adjusted under 35 U.S.C. 154(b) by 0 days.

(21) Appl. No.: 11/351,453

(22) Filed: Feb. 10, 2006

(65) Prior Publication Data

US 2006/0178101 A1   Aug. 10, 2006

Related U.S. Application Data

(60) Provisional application No. 60/651,809, filed on Feb. 10, 2005.

(51) Int. Cl.
*A22C 11/00* (2006.01)

(52) U.S. Cl. ........................................ 452/51

(58) Field of Classification Search ............ 452/21–23, 452/30–32, 35, 36, 46–48, 51
See application file for complete search history.

(56) References Cited

U.S. PATENT DOCUMENTS

| | | | | |
|---|---|---|---|---|
| 4,880,105 A * | 11/1989 | Kasai et al. | ............. | 198/465.4 |
| 5,512,012 A * | 4/1996 | Lendle et al. | ................. | 452/35 |
| 6,572,465 B1 * | 6/2003 | Kimura | ...................... | 452/51 |
| 6,659,853 B1 * | 12/2003 | Hergott et al. | ................. | 452/31 |
| 6,786,813 B1 * | 9/2004 | Shefet et al. | ................. | 452/51 |

* cited by examiner

*Primary Examiner*—Thomas Price
(74) *Attorney, Agent, or Firm*—Trexler, Bushnell, Giangiori, Blackstone & Marr, Ltd.

(57) ABSTRACT

An apparatus for automatically delivering raw sausages to a smokehouse rack is described. A continuous rotating conveyor holds a plurality of half-tubular trays hung on gimbals. Sausages are extruded into a tray at a loading station, and the tray is carried around by the conveyor to an unloading station, where an arm causes the tray to tilt and to roll the sausage onto a smokehouse rack.

3 Claims, 6 Drawing Sheets

CONTINUOUS AUTOMATIC RACK LOADER

PRIORITY

This application claims the benefit of U.S. provisional application Ser. No. 60/651,809, filed on Feb. 10, 2005.

BACKGROUND OF THE INVENTION

This invention relates generally to the field of sausage preparation. Specifically, this invention relates to loaders used to hold sausages during smoking or cooking.

Sausages are made by filling a tubular casing, such as one made from a collagen film, with a pasty product. The pasty product is usually a mixture of minced meat and seasonings, but can also include vegetarian products. Often, the tubular casing is itself wrapped in a tubular netting. The sausage is then processed by smoking, cooking, aging, steaming, or other finishing operation. The netting is usually left on the sausage during the finishing operation and may or may not be removed prior to sale to the consumer. An illustrative process of making sausages is described in U.S. Pat. No. 5,024,041 to Urban, Process for Filling Tubular Casings.

As the sausages are produced by, for example, the apparatus described in the '041 patent, they are extruded onto a table. Workers are employed to lift the sausages off the table and place the sausages on a platform of a rack. A rack is a framed device, with numerous platforms attached to the frame. Racks are usually about six feet in height, to be able to fit into a standard smokehouse. Racks are usually on wheels. Once a worker has filled up each tray of a rack with raw sausages, the rack is wheeled into a smokehouse for finishing.

Problems arise in this method of manufacture of sausages. Sausages are raw when initially made and not particularly stiff at that time. Accordingly, it is difficult for a worker to keep a sausage completely straight, as a worker who supports a, for example, three-foot-long sausage with two hands will often find the sausage bending or sagging in the middle. Bending and sagging create unsightly blemishes in the collagen casing, displeasing to consumers. Additionally, the manual nature of the operation means some percentage of sausages will be dropped and therefore ruined.

Accordingly, a need exists for an apparatus and method to load freshly-made sausages directly onto a rack than can be then wheeled into a smokehouse for further processing. The present invention meets this need.

BRIEF SUMMARY OF THE INVENTION

Briefly, the preferred embodiment of the present invention is a system for making and loading sausages, comprising a sausage stuffer/clipper; a rack loader; and a rack having a plurality of platforms; in which the rack loader comprises a conveyor rotating on a frame in a path and having a loading side and an unloading side, the sausage stuffer/clipper being located adjacent the loading side and the rack being located adjacent the unloading side, a plurality of gimbals projecting from the conveyor, a plurality of trays each having an open first end adapted to receive a sausage from the stuffer/clipper on the loading side and each being suspended from a one of the plurality of gimbals, and an arm within a cylinder mounted at a first end on the frame, the arm movable in a reciprocating manner from a first position proximal to the frame to a second position distal to the frame, the second position being in the path of the conveyor on the unloading side and adjacent a one of the plurality of platforms, the arm being configured to contact in the second position a one of the plurality of trays rotating in the path on the unloading side, to cause the one of the plurality of trays to rotate and to discharge a sausage carried on the one of the plurality of trays, onto the one of the plurality of platforms having a position adjacent the second position; the cylinder being further slidably mounted at an intermediate position to a sleeve connected to the frame, the cylinder movable along the sleeve to orient the second position adjacent a different one of the plurality of trays; a step motor to rotate the conveyor; and a controller to control at least the motor and the arm.

In another embodiment, the arm does not reciprocate but stays in the path.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE INVENTION

Figure 1:
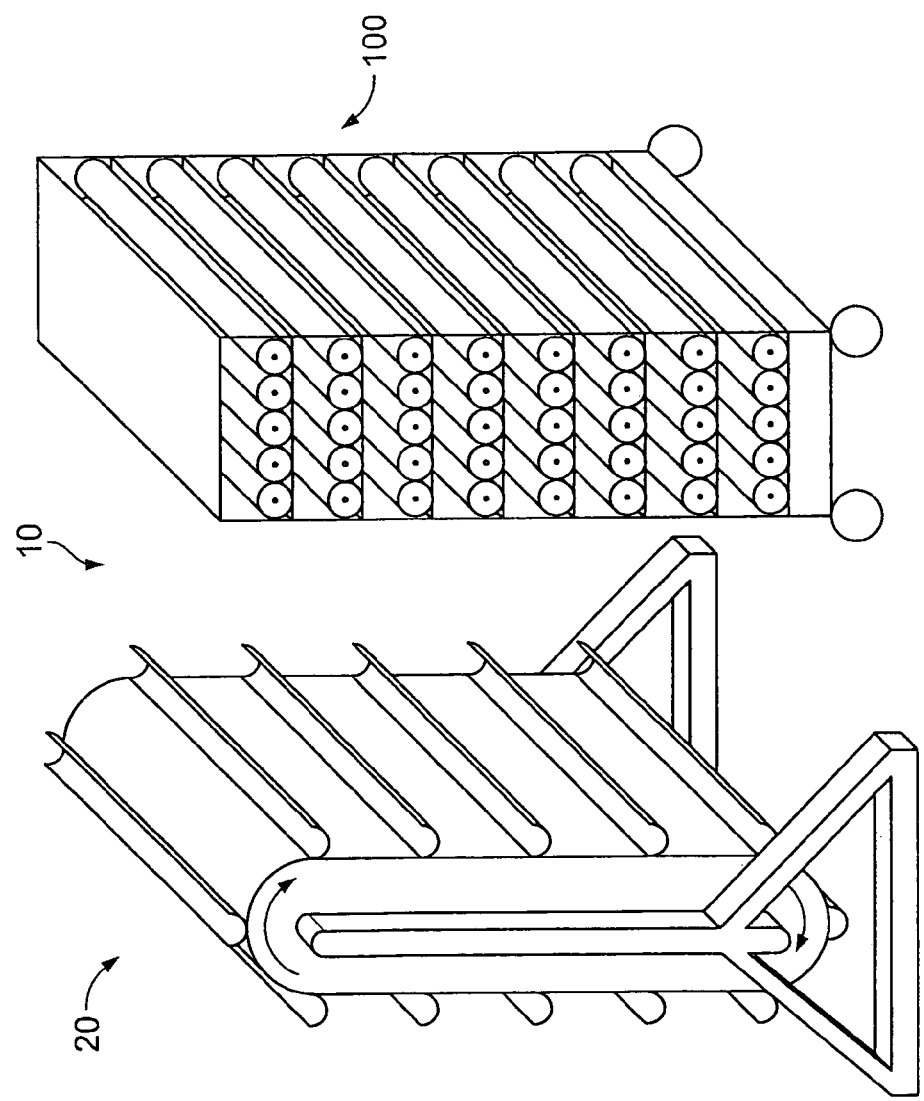
FIG. 1 is a side perspective view of a conveyor system of the preferred embodiment of the present invention, showing a continuous automatic rack loader and a rack being loaded.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
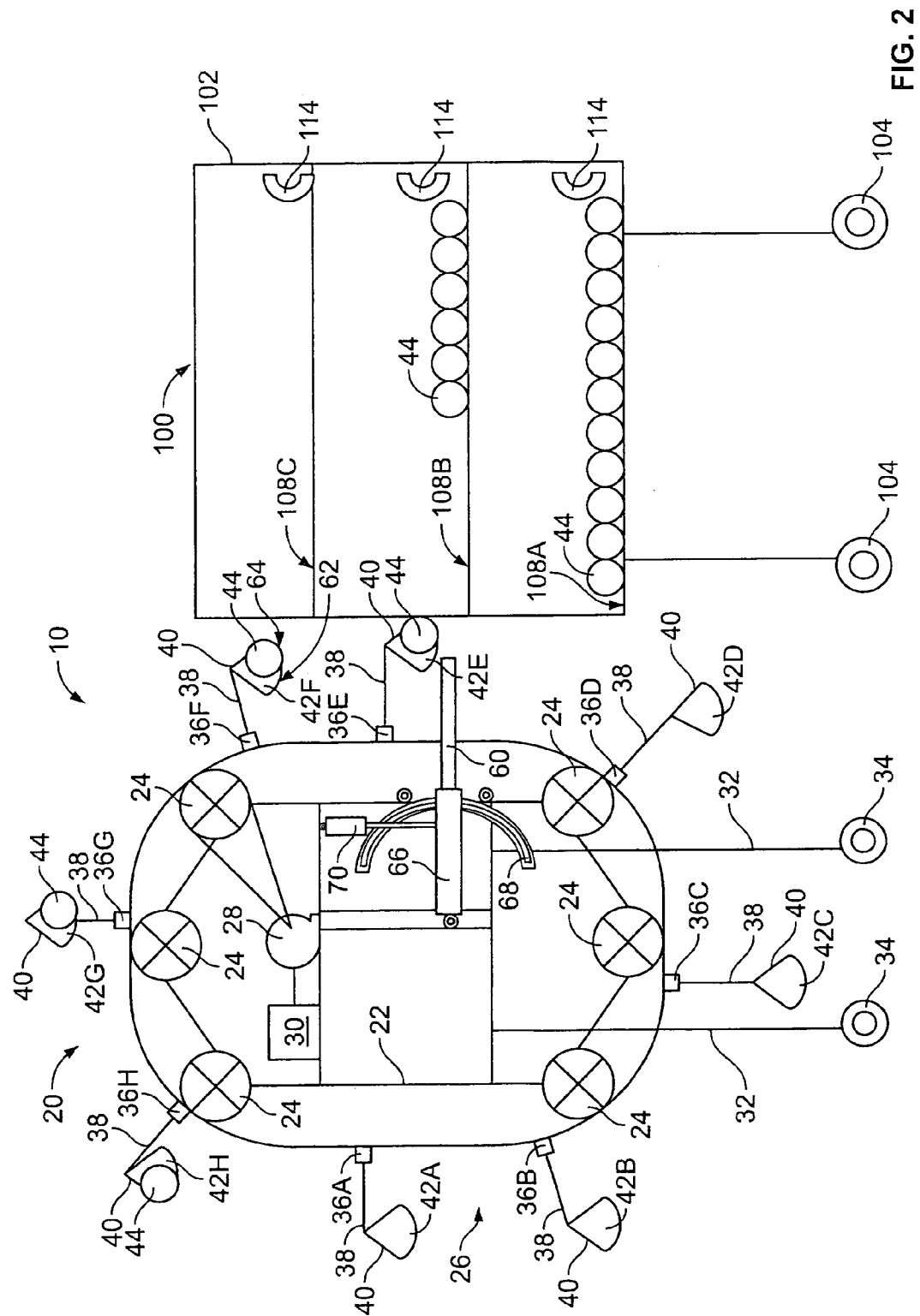
FIG. 2 is a front elevational view of FIG. 1.

The conveyor system 10 of the preferred embodiment of the present invention is shown in FIGS. 1 and 2. Loader 20 has a frame 22 carrying a plurality of wheels 24, on which travels rotating conveyor 26 in a generally oval path. Motor 28 drives the conveyor 26 in, as seen from the view of FIG. 1, a clockwise direction. Motor 28 is preferably a stepmotor. Preferably, a programmed logic controller, PLC 30, controls motor 28, although another type of controller or a manual control is possible. Frame 22 is fastened to legs 32, which preferably are fixed to casters 34 for ease of movement. Since the loader 20 is preferably intended for use in a food-manufacturing establishment, all external components are made of stainless steel or other easily cleaned and disinfected material.

Figure 4:
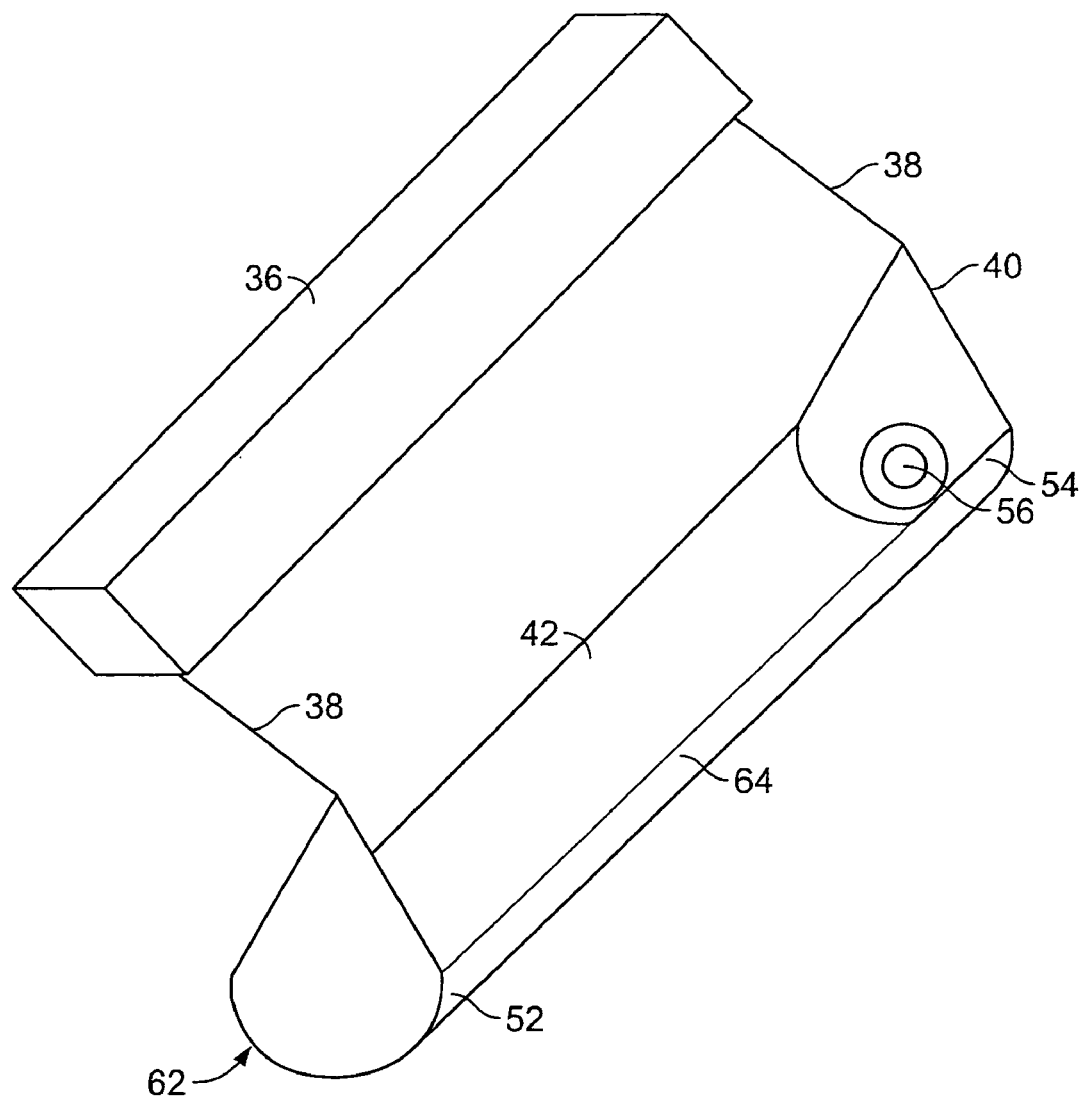
FIG. 4 is a perspective view of a truss and tray of the conveyor system of FIG. 1.

Conveyor 26 carries a plurality of horizontal trusses 36. In the embodiment illustrated in FIG. 1, there are eight trusses 36A through 36H, but another number of trusses 36 can be used without departing from the present invention. At the ends of each truss 36, as shown in more detail in FIG. 4, two cantilever arms 38 project perpendicularly. A gimbal 40 hangs from each cantilever arm 38 and supports one end of a half-tubular tray 42. Each half-tubular tray 42 is at least the length of a sausage. Because each tray 42 is suspended from two gimbals 40, each tray 42 hangs down from two cantilever arms 38, regardless of the orientation of the cantilever arms 38 relative to gravity. Accordingly, as the conveyor 26 moves around in a clockwise direction, the cantilever arms 38 are perpendicular to the direction of travel of conveyor 26, so that the orientation of the cantilever arms 38 changes with respect to gravity, but the trays 42 remain hanging with their bottom side down, so that a sausage 44 placed in a tray 42 will remain in place. As shown in FIG. 1, eight trays 42A through 42H are provided to correspond to the eight trusses 36A through 36H.

Figure 3:
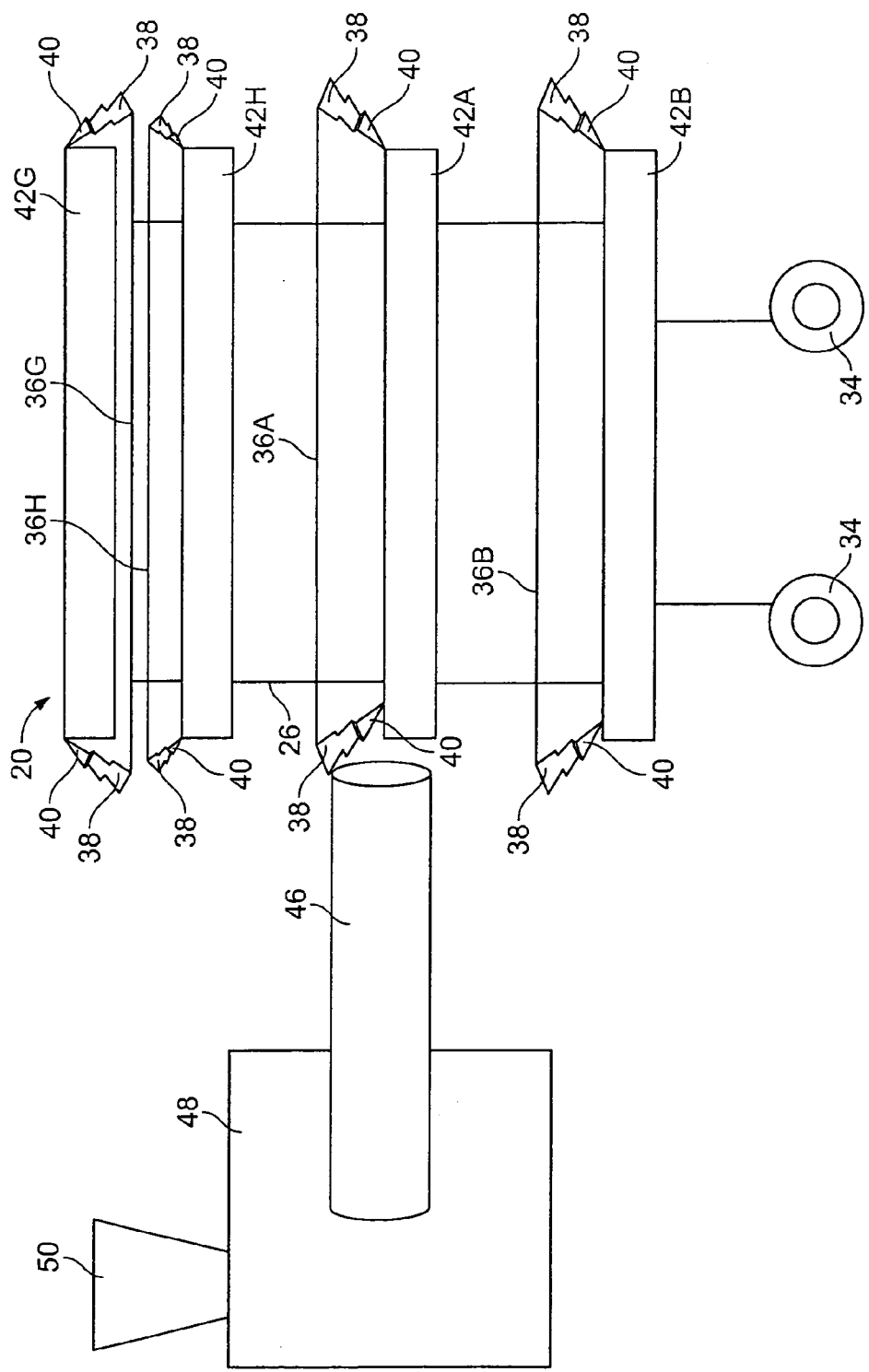
FIG. 3 is a side plan view of a tray of the continuous automatic rack loader of FIG. 1.

As shown in FIG. 3, loader 20 of the preferred embodiment is placed immediately adjacent the outlet 46 of a sausage-making machine 48. Machine 48 is preferably a conventional stuffer clipper, more preferably an automated stuffer/clipper such as a Model TCSA 65 sold by Poly-clip System Corp. Minced meat and spices are fed into the input 50 of machine 48, which grinds those components and mixes them to create a pasty filling. That filling is extruded through the outlet 46, preferably into a casing and netting as described in, for example, U.S. Pat. No. 5,024,041 to Urban, Process for Filling Tubular Casings, U.S. patent application Ser. No. 10/695,115, Apparatus and method to net food products in shirred tubular casing, and U.S. patent application Ser. No. 10/867,977, Apparatus and method to net food products in shirred tubular casing, the disclosures of which are incorporated herein by reference.

As a sausage 44 is created by extrusion, it projects from outlet 46 and is captured by a tray 42 that is currently on the loading side of loader 20, at the level of outlet 46. As a sausage 44 grows in length during the extrusion process, it moves farther into tray 42, from the end 52 of tray 42 proximal to machine 48 to the distal end 54. Preferably, distal end 54 is closed so that a sausage 44 cannot proceed off tray 42 at the distal end 54. When the protruding end of sausage 44 reaches distal end 54, which can be determined by detector 56, machine 48 finishes the opposite end of sausage 44 by crimping, clipping, and cutting in the usual manner familiar to those of skill in the sausage-making business and described in, for example, the art referenced in the previous paragraph. Detector 56 is a proximity switch, light sensor, or other position-detecting means.

Alternatively, machine 48 may have its own controls that determine the size of the sausage 44, and these controls activate to crimp, clip, and cut the sausage pursuant to the algorithm programmed into those controls.

Figure 5:
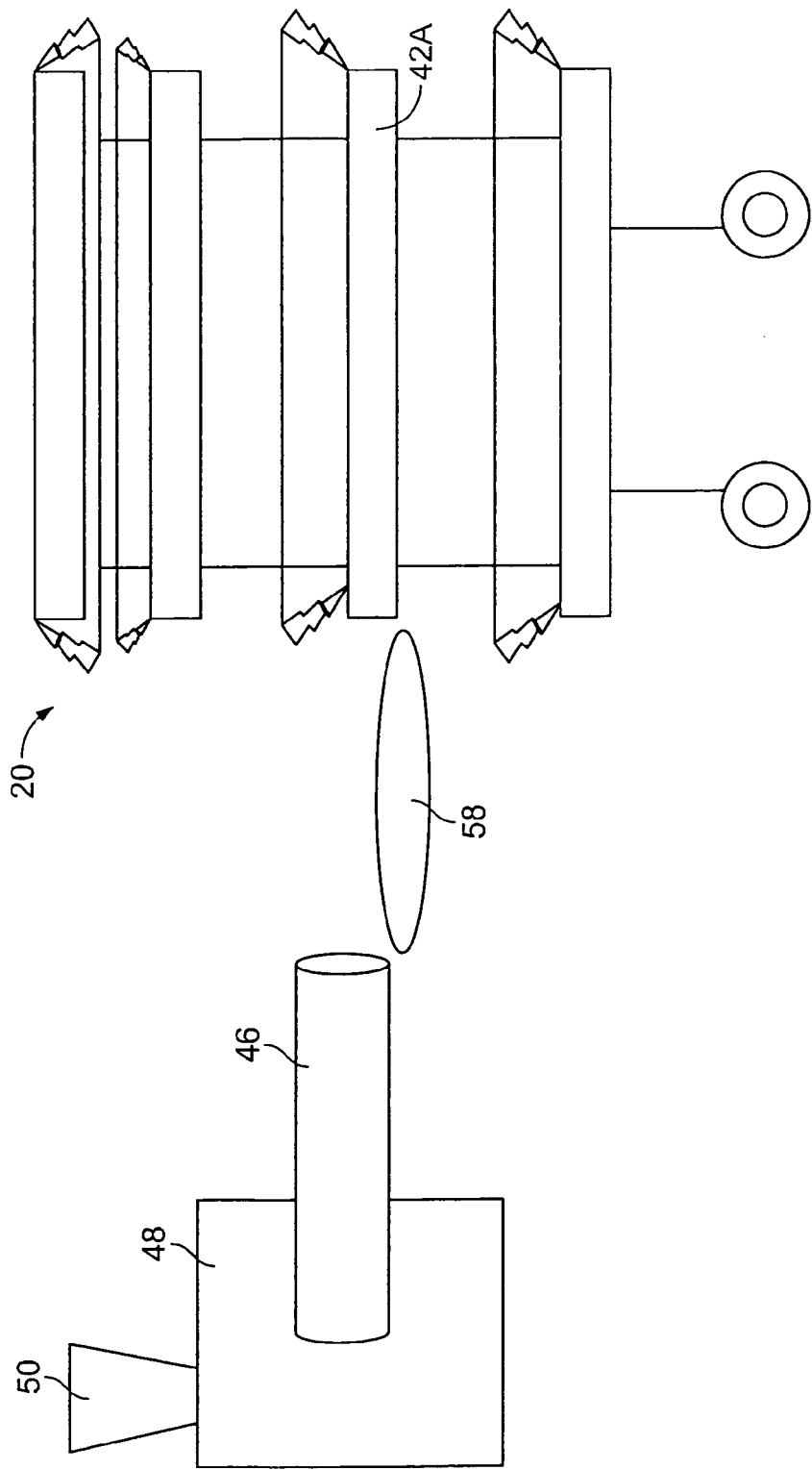
FIG. 5 is a side elevational view of another embodiment of the conveyor system.

In another embodiment of the present invention, a conveyer belt 58 or other intermediate structure can be interposed between machine 48 and the loading side of loader 20, as shown in FIG. 5. In this embodiment, a sausage 44 is extruded from machine 48 and onto conveyor belt 58. When a completed sausage 44 is fully upon conveyor belt 58 and has been clipped and severed in the usual manner, conveyor belt 58 actuates to move sausage 44 onto tray 42 as described above. Conveyor belt 58 is preferably controlled by PLC 30 through control of motor 28.

Once a particular tray 42A has a sausage 44 in it, PLC 30 actuates motor 28 to rotate conveyor 26 one increment. The next empty tray 42B now is moved to the outlet 46 of machine 48 (or at the discharge end of conveyor belt 58). Tray 42H, as illustrated in FIG. 1, which has a sausage 44 in it, has moved along the path of travel of conveyor 26 but remains hanging downward, as illustrated in FIG. 1, because it is suspended from gimbals 28. When a completed sausage 44 is fully loaded into tray 42A, conveyor 26 rotates another increment to bring tray 42B to the loading position. Tray 42A and 42H, being suspended, remain handing downward.

Rack 100 is located adjacent the unloading side of loader 20, as shown in FIGS. 1 and 2. Rack 100 has a frame 102 supported on casters 104, 106. A plurality of platforms 108 are fastened within frame 102 and are slightly tilted toward from the front 110 to the back 112. Rack 100, when full of sausages 44, will be wheeled to a smokehouse. Accordingly, platforms 108 are preferably permeable to smoke and accordingly are either solid sheets punched with holes or are constructed of parallel bars, as in a grill, to allow circulation of smoke.

As illustrated in FIG. 1, rack 100 has three platforms 108A through 108C. More platforms 108 can be used without departing from the present invention, as loader 20 is designed to load sausages 44 onto any number of platforms 108.

When a tray 42 reaches the unloading station on the side of the loader 20 adjacent rack 100, it must unload the sausage 44. The position of the unloading station depends on the state of occupancy of the various platforms 108 in rack 100. The occupancy of a particular platform 108 is determined by a sensor 114, one of which is located at the back 112 of each platform 108. The sensors 114 can be proximity switches, light sensors, or other position indicators, and are coupled to PLC 30.

Preferably, loader 20 completely fills up the bottom platform 108A first, and then the next lowest platform 108B, until rack 100 is full. In the illustrated embodiment, when each sensor 114 at each platform 108 show that all racks are empty, PLC 30 will operate loader 20 to fill platform 108A until it is full. Preferably, the style of sausage being made is entered into PLC 30 so that the number of sausages of that style that fit within the known size of platform 108 can be calculated by PLC 30. The loader 20 will then load sausages 44 onto that platform 108 until that number of sausages 44 has been loaded. Loader 20 will then proceed to fill up the next platform 108 that is empty.

To place sausages 44 onto a platform 108, an arm 60 projects from loader 20 and interferes with the path of travel of the inside portion 62 of tray 30. As conveyor 26 continues to rotate in a clockwise direction, the cantilever arms 38 on the side of loader 20 proximate to rack 100 move downward, causing tray 42 to rotate in a clockwise direction, as inside portion 62 is stopped when tray 42 contacts arm 60 and outside portion 64 is free to travel. When tray 42 rotates, the sausage 44 carried in tray 42 is caused to roll out of tray 42 and onto platform 108 (in FIG. 1, onto platform 108B). Since each platform 108 has a slight tilt from front to back, sausage 44 rolls toward the back 112 of rack 100. This process continues until a particular platform 108 is full of sausages, as described above, at which point PLC 30 instructs loader 20 to unload sausages 44 at a different platform 108.

For example, as illustrated in FIG. 1, platform 108A has been filled with sausages 44. Platform 108B is partially filled and still in the process of being loaded. Platform 108C is empty and waiting to be loaded. Tray 42A is about to be loaded with a sausage 1. Trays 42F, 42G, and 42H are carrying sausages 44 and in route to rack 100. Tray 42E is about to unload a sausage 44 onto platform 108B, since arm 60 is projecting into the path of travel and about to be contacted by inside portion 62 of tray 42E. Trays 42B, 42C, and 42D are empty and traveling back to pick up another sausage 44.

Figure 6:
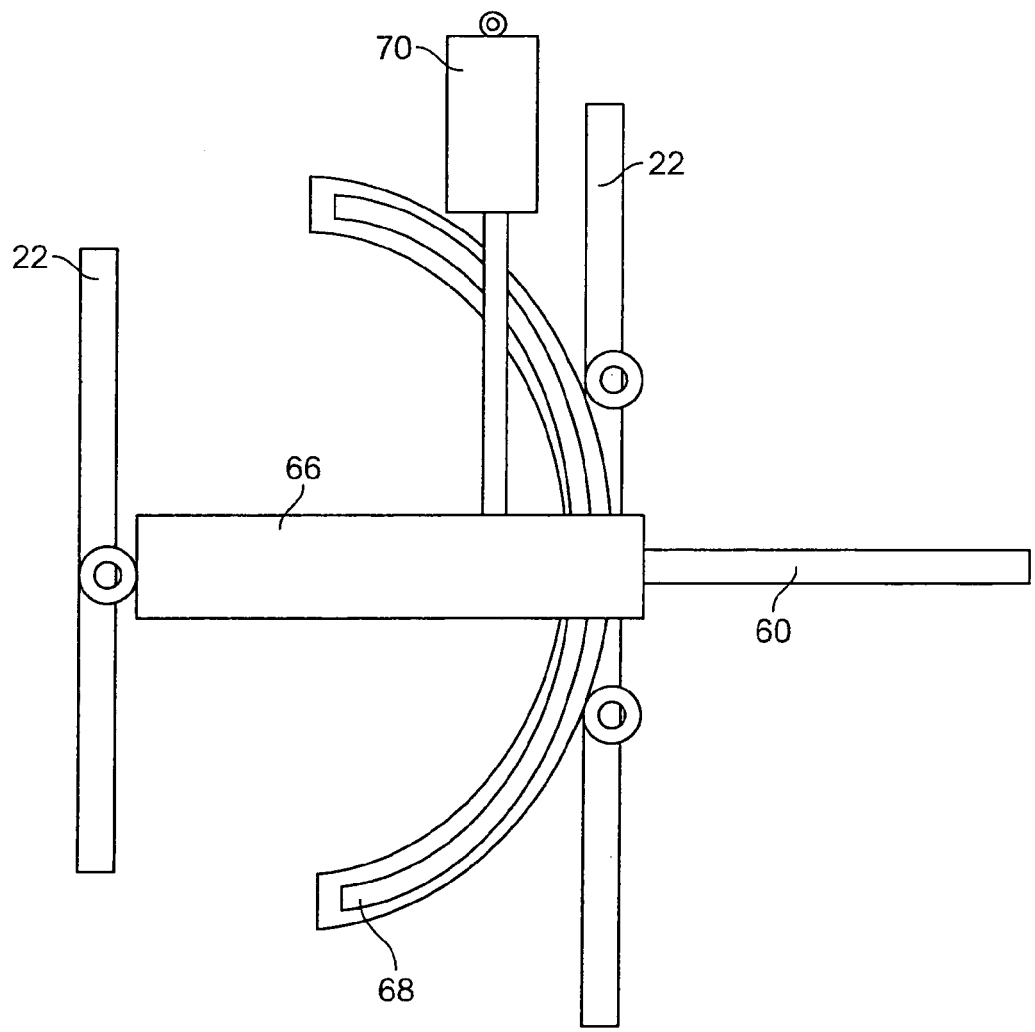
FIG. 6 is a side elevational view of an arm and sleeve of a continuous automatic loader of the preferred embodiment of the present invention.

Arm 60, as shown in FIG. 6, is preferably the piston of an air-actuated cylinder 66, although other ways to achieve reciprocating motion will suffice. Cylinder 66 is rotatably mounted at one end to and within frame 22 and slidably mounted at an intermediate position to arcuate sleeve 68, which is itself mounted rigidly to frame 22, as shown in FIG. 2. Actuation of cylinder 66 causes arm 60 to extend and retract in a reciprocating motion, from its recessed position inside or proximal to frame 22, to an extended position distal to frame 22 and in the path of the trays 42 rotating on conveyor 26.

A second air-actuated cylinder 70 causes cylinder 66 to move up and down through the arc of sleeve 68. Both cylinder 66 and cylinder 70 are connected to a pressurized air source, such as plant air, bottled air, or an air compressor, and are controlled by PLC 30.

When cylinder 70 actuates to move cylinder 66 (and arm 60) to the lowest portion of sleeve 68, arm 60 is pointing at and is adjacent to platform 108C. When arm 60 extends into the path, arm 60 contacts the next tray 42 to rotate along the path and causes the next tray 42 to tilt at platform 108C and to roll the sausage 44 onto platform 108C. When cylinder 70 positions arm 60 at a middle point within sleeve 68, actuation of cylinder 66 causes arm 60 to extend to point at and be adjacent to platform 108B. When cylinder 70 positions arm 60 at the top portion of sleeve 68, actuation of cylinder 66 causes arm 60 to extend to point at and be adjacent to platform 108A. Controller 30 is programmed to cause cylinder 70 to position arm 60 to extend at whatever location within the path of conveyor 26 is adjacent to the next platform 108 to be filled. When that platform 108 is filled with sausages, controller 30 causes cylinder 70 to position arm 60 to extend at whatever location within the path of conveyor 26 is adjacent to the next platform 108 to be filled with sausages. Controller 30 is programmed for the number of platforms 108 on rack 100.

Preferably, after arm 60 has tilted tray 42 at whatever platform 108 is called for by PLC 30, and the sausage 44 has rolled off onto the platform 108, cylinder 66 causes arm 60 to retract, allowing tray 42, now empty, to pass and continue on its route around to pick up another sausage 44.

In another embodiment, however, arm 60 does not retract after each sausage is loaded. Instead, each tray 42 rolls under arm 60 during the unloading operation and then continues on its route around to pick up another sausage.

PLC 30, aided by sensors 114 (one on each platform 108), will first position arm 60 to fill up a platform 108, preferably the lowest, platform 108C. The number of sausages 44 that will fit depends, of course, on the diameter of the sausages 44, which varies with the type of sausage being made. When platform 108C is full, cylinder 70 moves arm 60 to point to platform 108B. When platform 108B is full, cylinder 70 moves arm 60 to point to platform 108A. Please note that PLC 30 must be programmed to control the length of the stroke of cylinder 66 in order to place arm 60 at the proper point to tip tray 42 when it reaches a particular platform 108, since the stroke to reach tray 42 at platforms 108A and 108C is longer than the stroke to reach tray 42 at platform 108B.

It will be a matter of routine experimentation, well within the skill of the art, to program PLC 30 to tilt tray 42 at any number of platforms 108, depending on the size of rack 100.

While preferred embodiments of the present invention are shown and described, it is envisioned that those skilled in the art may devise various modifications of the present invention without departing from the spirit and scope of the claims.

We claim:

1. A system for making and loading sausages, comprising:
a sausage stuffer/clipper;
a rack loader; and
a rack having a plurality of platforms; wherein
the rack loader comprises a conveyor rotating on a frame in a path and having a loading side and an unloading side, the sausage stuffer/clipper being located adjacent the loading side and the rack being located adjacent the unloading side;
a plurality of gimbals projecting from the conveyor;
a plurality of trays each having an open first end adapted to receive a sausage from the stuffer/clipper on the loading side and each being suspended from a one of the plurality of gimbals;
an arm within a cylinder mounted at a first end on the frame, the arm movable in a reciprocating manner from a first position proximal to the frame to a second position distal to the frame, the second position being in the path of the conveyor on the unloading side and adjacent a one of the plurality of platforms, the arm being configured to contact in the second position a one of the plurality of trays rotating in the path on the unloading side, to cause the one of the plurality of trays to rotate and to discharge a sausage carried on the one of the plurality of trays, onto the one of the plurality of platforms having a position adjacent the second position;
the cylinder further slidably mounted at an intermediate position to a sleeve connected to the frame, the cylinder movable along the sleeve to orient the second position adjacent a different one of the plurality of trays;
a step motor to rotate the conveyor; and
a controller to control at least the motor and the arm.

2. A system for making and loading sausages, comprising:
a sausage stuffer/clipper;
a rack loader; and
a rack having a plurality of platforms; wherein
the rack loader comprises a conveyor rotating on a frame in a path and having a loading side and an unloading side, the sausage stuffer/clipper being located adjacent the loading side and the rack being located adjacent the unloading side;
a plurality of gimbals projecting from the conveyor;
a plurality of trays each having an open first end adapted to receive a sausage from the stuffer/clipper on the loading side and each being suspended from a one of the plurality of gimbals;
an arm within a cylinder mounted at a first end on the frame and extending into the path of the conveyor on the unloading side and adjacent a one of the plurality of platforms, the arm being configured to contact in the second position a one of the plurality of trays rotating in the path on the unloading side, to cause the one of the plurality of trays to rotate and to discharge a sausage carried on the one of the plurality of trays, onto the one of the plurality of platforms having a position adjacent the second position;
the cylinder further slidably mounted at an intermediate position to a sleeve connected to the frame, the cylinder movable along the sleeve to orient the second position adjacent a different one of the plurality of trays;
a step motor to rotate the conveyor; and
a controller to control at least the motor and the arm.

3. A system for making and loading sausages, comprising:
means for making a sausage; and
means for loading a sausage onto a rack having a plurality of platforms; wherein
the means for loading comprising a conveyor means for rotating in a path, a plurality of tray means for receiving and carrying a sausage from the means for making, the tray means suspended from the conveyor means, the conveyor means having a loading side and an unloading side, the means for making being located adjacent the loading side and the rack being located adjacent the unloading side;

an arm means, mounted within the means for loading, for contacting the tray means on the unloading side, to discharge the sausage, onto a one of the plurality of platforms having a position adjacent the second position;
cylinder means to orient the arm means adjacent a different one of the plurality of platforms;
a motor means for rotating the conveyor means; and
a control means for controlling the conveyor means, the arm means, and the cylinder means.

* * * * *